United States Patent
Imai et al.

(10) Patent No.: US 10,193,124 B2
(45) Date of Patent: Jan. 29, 2019

(54) BATTERY CONNECTING BODY AND POWER SUPPLY DEVICE

(71) Applicant: Yazaki Corporation, Tokyo (JP)

(72) Inventors: Masaru Imai, Kakegawa (JP); Satoshi Hishikura, Kakegawa (JP); Terumichi Matsumoto, Kakegawa (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 257 days.

(21) Appl. No.: 14/938,363

(22) Filed: Nov. 11, 2015

(65) Prior Publication Data

US 2016/0064718 A1    Mar. 3, 2016

Related U.S. Application Data

(63) Continuation of application No. PCT/JP2014/063279, filed on May 20, 2014.

(30) Foreign Application Priority Data

May 21, 2013  (JP) .................................. 2013-106810

(51) Int. Cl.
*H01M 2/00* (2006.01)
*H01M 2/20* (2006.01)
(Continued)

(52) U.S. Cl.
CPC .............. *H01M 2/206* (2013.01); *H01M 2/06* (2013.01); *H01M 2/1077* (2013.01); *H01M 2/30* (2013.01); *H01M 2220/20* (2013.01)

(58) Field of Classification Search
CPC ............ H01M 2/34; H01M 2/30; H01M 2/10; H01M 2/20; H01M 2/206; H01M 2/06; H01M 2/1077; H01M 2/344; H01M 2/202
See application file for complete search history.

(56) References Cited

U.S. PATENT DOCUMENTS

2011/0104555 A1*  5/2011  Han .................... H01M 2/1077
                                               429/159
2013/0309553 A1* 11/2013  Kinoshita ........... H01M 2/1077
                                               429/158

FOREIGN PATENT DOCUMENTS

JP         07-130353    * 11/1993  ............. H01M 2/34
JP        7-130353 A      5/1995
(Continued)

OTHER PUBLICATIONS

English Translation of JP 07-130353.*
International Search Report for PCT/JP2014/063279 dated Jul. 15, 2014.

*Primary Examiner* — Nicholas P D'Aniello
(74) *Attorney, Agent, or Firm* — Sughrue Mion, PLLC

(57) ABSTRACT

To provide a battery connecting body and a power supply device capable of maintaining a state where a cover portion covers a connecting member. A bus bar module includes a plurality of bus bars that each connects electrodes of adjacent ones of a plurality of batteries arranged such that the electrodes thereof are arranged on a straight line to electrically connect the plurality of batteries in series and a casing that houses the plurality of bus bars. The casing includes a plurality of bus bar housing portions that each house each of the bus bars and the cover portions that each cover an opening of each of the bus bar housing portions, and the cover portions are each retained by the bus bar.

14 Claims, 4 Drawing Sheets

(51) Int. Cl.
*H01M 2/06* (2006.01)
*H01M 2/10* (2006.01)
*H01M 2/30* (2006.01)

(56) References Cited

FOREIGN PATENT DOCUMENTS

| | | | |
|---|---|---|---|
| JP | 11-86831 A | 3/1999 | |
| JP | 2012-169256 A | 9/2012 | |
| JP | 2014-82080 A | 5/2014 | |
| WO | WO2012102373 | * 8/2012 | .............. H01M 2/34 |

* cited by examiner

BATTERY CONNECTING BODY AND POWER SUPPLY DEVICE

TECHNICAL FIELD

The present invention relates to a battery connecting body and a power supply device and, more particularly, to a battery connecting body for electrically connecting a plurality of batteries and a power supply device including the battery connecting body.

BACKGROUND ART

A vehicle is mounted with various electronic devices and a battery module which serves as a power supply device obtained by combining a plurality of batteries and which supplies power to the electronic devices. Further, for example, an electric car that runs using an electric motor, a hybrid car that runs using both an engine and an electric motor, or the like is mounted with a battery module 101 serving as a drive source for the electric motor and functioning as the power supply device. The battery module 101 includes a battery group 120 in which a plurality of batteries 102 each having electrode terminals 102A are arranged. The batteries 102 constituting the battery group 120 are electrically connected to each other by a battery connecting assembly 100 (refer to, for example, Patent Literature 1).

As illustrated in FIG. 7, the battery connecting assembly 100 described in Patent Literature 1 includes a plurality of connecting units 110 connected to one another in a left-right direction (X-arrow direction). The plurality of connecting units 110 each include a connecting member 103 connecting the electrode terminals 102A of the adjacent batteries 102, a voltage detection terminal 104 overlapped on and connected to the connecting member 103, a housing portion 105 housing the connecting member 103 and the voltage detection terminal 104, and a groove-like wire routing portion 107 connected to the housing portion 105, in which one end side of a not illustrated voltage detection line whose other end is connected to the voltage detection terminal 104 is housed.

A cover 105B connected, through a hinge 105A, to a side surface of the housing portion 105 on an opposite side of the wire routing portion 107 is integrally formed with the housing portion 105. The cover 105B has a size that can cover the housing portion 105 and the wire routing portion 107. A cover lock 108 formed in the cover 105B and a cover lock receiving portion 109 formed in the wire routing portion 107 are elastically engaged with each other, whereby the cover 105B is retained in a state of covering the housing portion 105 and the wire routing portion 107.

CITATION LIST

Patent Literature

Patent Literature 1: JP 2012-169256 A

SUMMARY OF INVENTION

Technical Problem

However, in the above-described conventional battery module 101, when the vehicle mounted with the battery connecting assembly 100 is vibrated, the housing portion 105 may interfere with other members due to the vibration and be damaged. When the housing portion 105 is damaged, the engagement between the cover lock 108 and cover lock receiving portion 109, which has been covering the housing portion 105, may be released to expose an opening of the housing portion 105, which may expose the connecting member 103. Even if the housing portion 105 is damaged, the battery module 101 can operate as the drive source for the electric motor. However, the exposure of the connecting member 103 may cause foreign matters to straddle over electrode terminals 102A of batteries 102 adjacent to each other on aside at which the connecting members 103 are adjacent to each other, to cause a short circuit between adjacent batteries 102. In this case, the battery module 101 may break down. That is, the battery module 101 may fail to operate properly as the drive source for the electric motor. The same problem may arise when such a battery module is used for power supply to the electronic devices mounted on the vehicle.

An object of the present invention is to provide a battery connecting body and a power supply device capable of maintaining a state where the cover portion covers the connecting member.

Solution to Problem

The present invention as described in a first aspect is a battery connecting body including: a plurality of connecting members that each connect electrodes of adjacent ones of a plurality of batteries arranged such that the electrodes thereof are arranged on a straight line to electrically connect the plurality of batteries; and a casing that houses the plurality of connecting members, wherein the casing includes a plurality of connecting member housing portions that each house each of the connecting members and cover portions that each cover an opening of each of the connecting member housing portions, and the cover portions are each retained by the connecting member.

According to the present invention as described in a first preferred aspect, in the present invention as described in claim 1, the cover portion has a protruding portion formed so as to protrude toward the connecting member, and the connecting member has a locking portion for locking the protruding portion.

According to the present invention as described in a second preferred aspect, in the present invention as described in claim 2, the cover portion has a pair of arms as the protruding portion, and each of the connecting members has a pair of contact portions that contact the electrodes of the adjacent batteries, and the locking portion that is disposed between the pair of contact portions and detachably locks the pair of arms.

According to the present invention as described in a third preferred aspect, in the present invention as described in the second preferred aspect, the connecting member housing portion has a bottom wall on which the connecting member is placed, and the connecting member has a stepped portion formed between the pair of contact portions and the locking portion so that the locking portion is disposed at a side further away from the bottom wall than the pair of contact portions in a state where the connecting member is housed in the connecting member housing portion.

According to the present invention as described in a fourth preferred aspect, in the present invention as described in the second preferred or third preferred aspect, the connecting member housing portion has a bottom wall on which the connecting member is placed, and the cover portion has a press portion that is formed so as to protrude in the same direction as the pair of arms and presses the connecting member toward the bottom wall of the connecting member housing portion.

The present invention as described in a second aspect is a power supply device including: a battery assembly including a plurality of batteries in which positive and negative electrodes are overlapped mutually in reverse; and a battery connecting body as described in any one of claims 1 to 5, wherein the connecting member is fixed to the electrodes of the batteries.

Advantageous Effects of Invention

According to the invention as described in the first aspect, the casing includes a plurality of connecting member housing portions each housing each connecting member and cover portions each covering opening of each of the plurality of connecting member housing portions, and the cover portions are each retained by the connecting member. With this configuration, even if cracks have occurred in the connecting member housing portion or even if the connecting member housing portion has been damaged due to application of vibration of a vehicle to the connecting member housing portion, the cover portion and the connecting member can be prevented from being separated from each other, and a state where the cover portion covers the connecting member can be maintained. Further, since the state where the cover portion covers the connecting member can be maintained, it is possible to prevent foreign matters from straddling over electrodes of batteries adjacent to each other on a side at which the connecting members are adjacent to each other to thereby prevent adjacent batteries from short-circuiting.

According to the invention as described in the first preferred aspect, the cover portion has protruding portion formed so as to protrude toward the connecting member, and the connecting member has a locking portion for locking the protruding portion. Thus, by locking the protruding portion of the cover portion to the locking portion of the connecting member housed in the connecting member housing portion, the protruding portion is disposed inside the connecting member housing portion in a state where the cover portion is retained by the connecting member. That is, the protruding portion is not exposed outside, so that even if the connecting member housing portion interferes with other members due to, e.g., vibration of the vehicle, the protruding portion is prevented from being damaged. Thus, the state where the cover portion covers the connecting member can be maintained more reliably.

According to the invention as described in the second preferred aspect, the cover portion has a pair of arms as the protruding portion formed so as to protrude toward the connecting member, and each of the connecting members has the locking portion that detachably locks the pair of arms. Thus, simply bring close and pushing the cover portion to the connecting member from an arm side can bend the pair of arms to cause the locking portion to be sandwiched between the pair of arms for mutual locking, whereby the cover portion can be retained by the connecting member. The pair of arms is disposed inside the connecting member housing portion in a state where the cover portion is retained by the connecting member. Further, the pair of arms is not exposed outside, so that even if the connecting member housing portion interferes with other members due to, e.g., vibration of the vehicle, the pair of arms is prevented from being damaged. Thus, the state where the cover portion covers the connecting member can be maintained more reliably. Further, the pair of arms are locked to the locking portion and, thereby, the cover portion is retained, so that it is possible to retain the cover portion with better stability and balance than, e.g., a configuration in which the cover portion has only a single arm, thereby making it difficult for the locking to be released due to vibration or the like.

According to the invention as described in the third preferred aspect, the connecting member has a stepped portion formed between a pair of contact portions and the locking portion so that the locking portion is disposed at a side further away from a bottom wall of the connecting member housing portion than the pair of contact portions in a state where the connecting member is housed in the connecting member housing portion. Accordingly, a space for the pair of arms to be locked by the locking portion is formed between the bottom wall of the connecting member housing portion and the connecting member. By processing the connecting member so as to form the space between the bottom wall of the connecting member housing portion and the connecting member, it is possible to eliminate the need to form a concave portion in the bottom wall, thereby reducing cost of producing a new die for forming the connecting member housing portion.

According to the invention as described in the fourth preferred aspect, the connecting member housing portion has the bottom wall on which the connecting member is placed, and the cover portion has a press portion that is formed so as to protrude in the same direction as the pair of arms and presses the connecting member toward the bottom wall of the connecting member housing portion. With this configuration, in a state where the locking portion locks the pair of arms, the connecting member is pushed to the bottom wall side by the press portion. Thus, in a state of being retained by the connecting member, the cover portion can be prevented from rattling in a protruding direction of the arm.

According to the invention as described in the second aspect, the power supply device includes a battery assembly including a plurality of batteries in which positive and negative electrodes are overlapped mutually in reverse and a battery connecting body as claimed in any one of claims 1 to 5, and the connecting member is fixed to the electrodes of the batteries. With this configuration, the cover portion is fixed to the batteries through the connecting member. Thus, even if cracks have occurred in the connecting member housing portion or even if the connecting member housing portion has been damaged due to application of vibration of the vehicle to the connecting member housing portion, the connecting member can reliably be prevented from being exposed.

DESCRIPTION OF EMBODIMENTS

Hereinafter, a bus bar module 1 as a battery connecting body and a power supply device according to an embodiment of the present invention will be described with reference to FIGS. 1 to 6.

Figure 1:
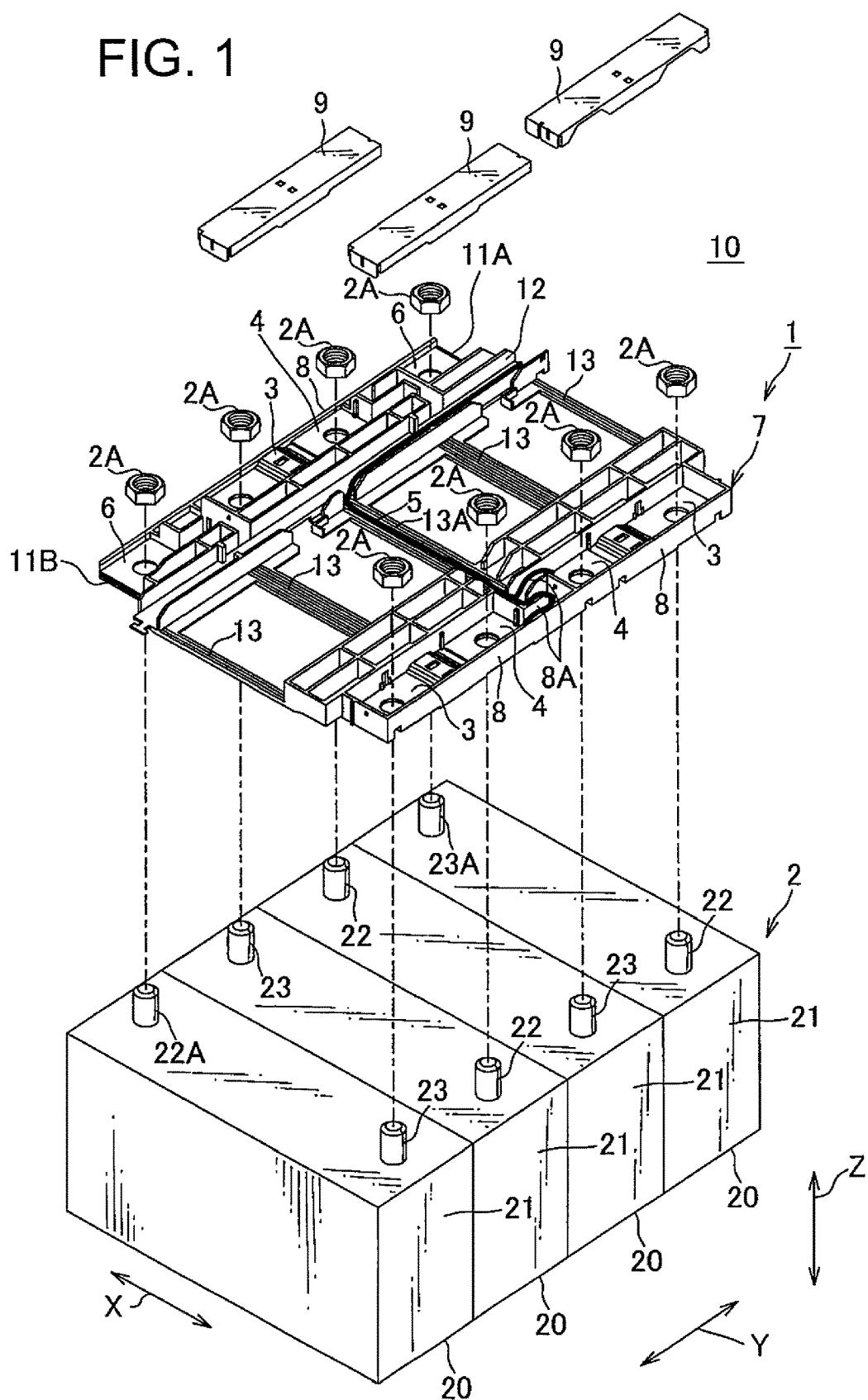
FIG. 1 is an exploded perspective view of a power supply device according to an embodiment of the present invention.

As illustrated in FIG. 1, the bus bar module 1 is attached to an upper surface of an illustrated battery assembly 2 to constitute a power supply device 10. The power supply device 10 is housed in, e.g., an engine room of a vehicle and used to supply power to various electronic devices mounted on the vehicle, such as an electronic control unit (ECU), an air-conditioner, and a car navigation device. Further, the power supply device 10 may be mounted on an electric car that runs using an electric motor or a hybrid car that runs using both an engine and an electric motor and used to supply power to the electric motor. Hereinafter, it is assumed that the power supply device 10 is used to supply power to electronic devices mounted on the vehicle. However, as a matter of course, the power supply device 10 may be used to supply power to the electric motor.

As illustrated in FIG. 1, the battery assembly 2 includes a plurality of batteries 20 and a fixing member (not illustrated) for fixing the plurality of batteries 20 in an overlapping manner. Each battery 20 includes a battery body 21 having a box-shaped casing filled with electrolyte, a positive electrode 22 (example of "electrode"), and a negative electrode 23 (example of "electrode"). The positive and negative electrodes 22 and 23 protrude from one and the other surfaces of the battery body 21, respectively. The positive and negative electrodes 22 and 23 are each formed into a columnar shape using a conductive metal and each have a screw groove to be engaged with a nut 2A on an outer peripheral surface thereof.

In the plurality of batteries 20, the electrodes thereof are arranged in two rows. In each row, the positive and negative electrodes 22 and 23 are alternately arranged on a straight line along an overlapping direction of the batteries 20. An arrow Y in FIG. 1 indicates an arrangement direction of the plurality of batteries 20 and a longitudinal direction of the bus bar module 1, an arrow X indicates a width direction of the bus bar module 1, and an arrow Z indicates a height direction of the bus bar module 1. Further, in the present specification, the height direction of the bus bar module 1 is sometimes referred to as an up-down direction.

Figure 2:
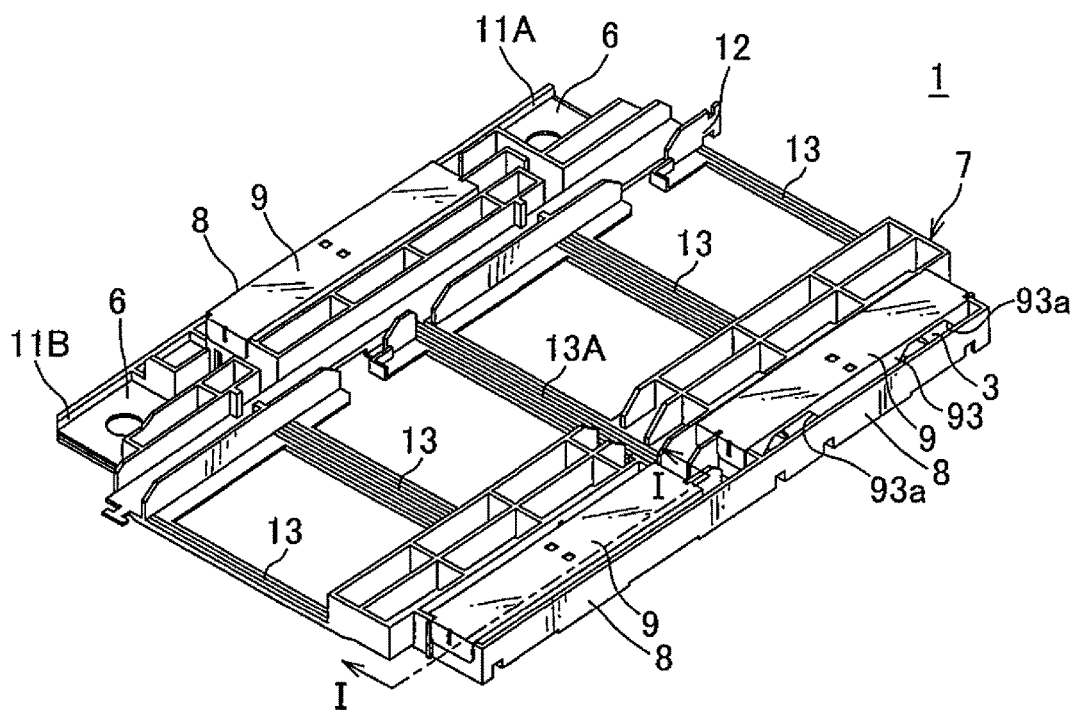
FIG. 2 is a perspective view illustrating a bus bar module constituting the power supply device.

The bus bar module 1 connects the above-mentioned plurality of batteries 20 in series. As illustrated in FIG. 2, the bus bar module 1 includes bus bars 3 serving as a plurality of connecting members each connecting the positive and negative electrodes 22 and 23 of the adjacent batteries 20 to thereby connect the plurality of batteries 20 in series, a plurality of voltage detection terminals 4 each electrically connected to each bus bar 3 to detect a voltage of each battery 20, a plurality of voltage detection lines 5 connected to each voltage detection terminal 4, a pair of power supply terminals 6 connected to different polarity electrodes 22A and 23B of the batteries 20 positioned at both ends of the plurality of batteries 20, and a casing 7 that houses the plurality of bus bars 3, the plurality of voltage detection terminals 4, and the plurality of voltage detection lines 5 (illustrated in FIG. 1), and the pair of power supply terminals 6. In the bus bar module 1, the pair of power supply terminals 6 connected to the different polarity electrodes 22A and 23B of the batteries 20 positioned at both ends of the battery assembly 2 are connected to the electronic device mounted on the vehicle to thereby supply power to the electronic device.

Figure 3:
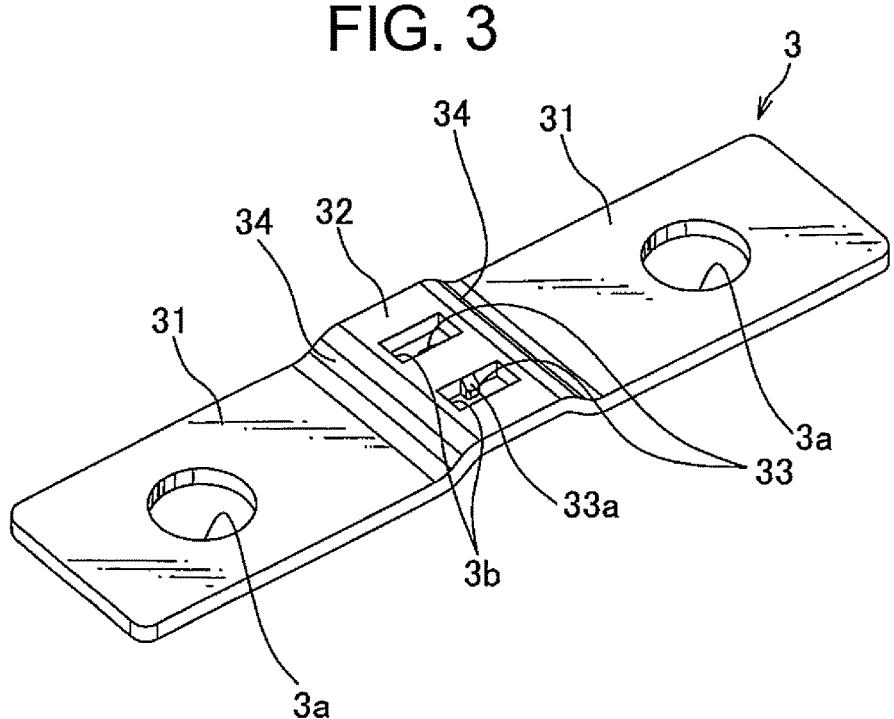
FIG. 3 is a perspective view of a bus bar constituting the bus bar module illustrated in FIG. 2.

The plurality of bus bars 3 are each obtained by pressing a metal plate. As illustrated in FIG. 3, each bus bar 3 integrally includes a pair of contact portions 31 having through holes 3a, respectively, through which the positive and negative electrodes 22 and 23 disposed adjacent to each other are inserted, and a locking portion 32 positioned between the pair of contact portions 31 so as to lock a cover portion 9 provided in the casing 7 so as to cover an opening of a bus bar housing portion 8. The bus bar 3 is formed into a rectangular shape as viewed from above, and the pair of contact portion 31 and the locking portion 32 are arranged in a longitudinal direction of the bus bar 3 (Y-arrow direction). The bus bar 3 is subjected to hammering, and thus, stepped portions 34 are formed between the pair of contact portions 31 and the locking portions 32. The locking portion 32 is raised from the pair of contact portions 31 in the direction that the bus bar 3 is hammered. By forming the stepped portions 34, when the bus bar 3 is placed on a bottom wall 80 of the bus bar housing portion 8, a space for the locking portion 32 to lock the cover portion 9 is formed between the bottom wall 80 and locking portion 32.

A pair of insertion holes 3b is formed on the locking portion 32 so as to penetrate the locking portion 32. The pair of insertion holes 3b receives insertion of a pair of arms 95 formed in the cover portion 9. The pair of insertion holes 3b is arranged in a width direction of the bus bar 3 (X-arrow direction). Further, in the locking portion 32, a pair of locking projections 33 for hooking the pair of arms 95 is formed so as to project toward both ends of the bus bar 3 in the width direction from inner peripheral surfaces of the respective insertion holes 3b. The locking projections 33 have guide surfaces 33a for guiding the pair of arms 95 in such a direction that they separate from each other. Each guiding surface 33a is formed so as to be inclined downward in a plate thickness direction of the bus bar 3 (Z-arrow direction) as it goes toward a leading end of the locking projection 33.

In the present embodiment, the pair of insertion holes 3b of the locking portion 32 is disposed so as to be shifted in the width direction of the bus bar 3 from a virtual line connecting centers of the through holes 3a of the pair of contact portions 31. With this configuration, in the bus bar 3, a distance between the through holes 3a of the pair of contact portions 31 can be minimized. This can ensure an energization region for effectively making current flow between the positive and negative electrodes 22 and 23 when they are inserted through the through holes 3a, respectively.

The plurality of voltage detection terminals 4 are each obtained by pressing a metal plate. As illustrated in FIG. 2, each voltage detection terminal 4 is formed into a plate shape and has, at its center, a through hole. The voltage detection terminal 4 is overlapped on each bus bar 3 to be electrically connected thereto with one of the positive and negative electrodes 22 and 23 of the batteries 20 inserted through the through hole and is electrically connected to the voltage detection line 5.

The pair of power supply terminals 6 are each obtained by pressing a metal plate. As illustrated in FIG. 1, the pair of power supply terminals 6 are each formed into a plate shape and each have, at its center, a through hole through which one of the electrodes 22A and 23A of the batteries 20 is inserted. The voltage detection terminal 4 is electrically connected to the battery 20 with one of the positive and negative electrodes 22A and 23A of the batteries 20 inserted through the through hole.

Figure 4:
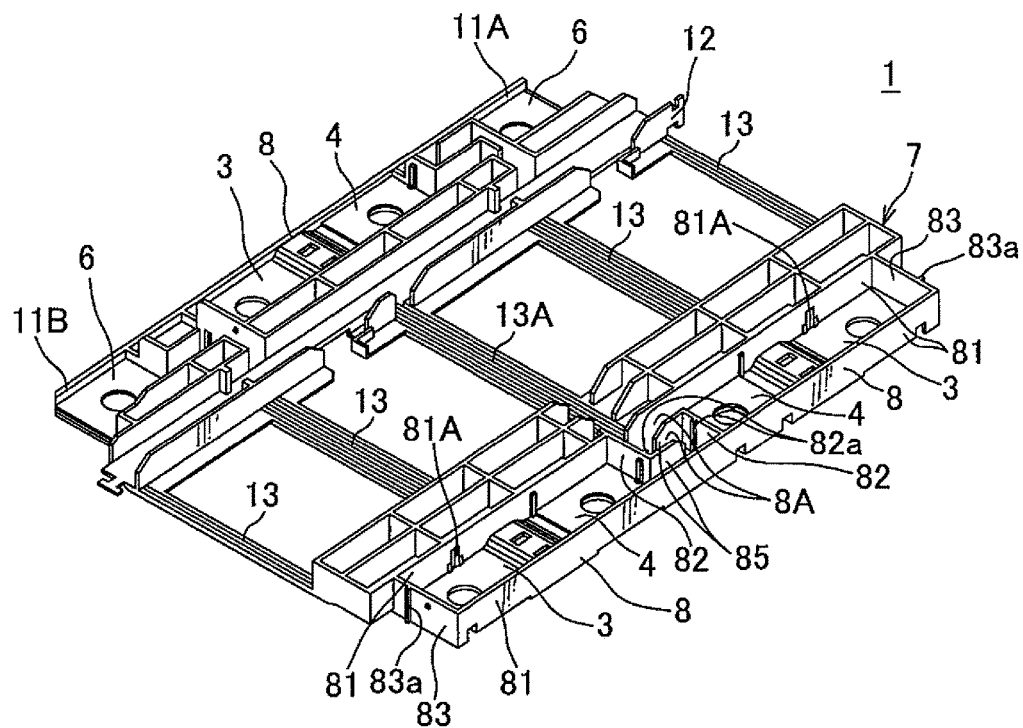
FIG. 4 is a perspective view illustrating a state where a cover portion is removed from the bus bar module illustrated in FIG. 2.

As illustrated in FIG. 1, the casing 7 is formed into a substantially rectangular shape substantially the same as that of the top surface of the battery assembly 2 and is overlapped on the top surface of the battery assembly 2. As illustrated in FIG. 4, the casing 7 includes bus bar housing portions 8 serving as a plurality of connecting member housing portions each formed into a box shape capable of housing each bus bar 3 and each voltage detection terminal 4 overlapped on the bus bar 3 and connected to each other on a straight line along the Y-arrow direction, a plurality of cover portions 9 each covering an opening of each of the bus bar housing portions 8, a pair of terminal housing portions 11A and 11B housing the pair of power supply terminals 6, respectively, and a gutter-shaped routing portion 12 provided on a straight line parallel to an arrangement direction of the plurality of bus bar housing portions 8 (Y-arrow direction) and routing the voltage detection line 5 connected to the voltage detection terminal 4 in the Y-arrow direction.

The plurality of bus bar housing portions 8 are connected to one another in the longitudinal direction of the bus bar module 1 (Y-arrow direction) and arranged in two rows spaced apart from each other in the width direction of the bus bar module 1 (X-arrow direction). The routing portion 12 arranged in parallel to the rows of the bus bar housing portions 8 is positioned between the two rows of the bus bar housing portions 8. The routing portion 12 is provided so as to be continued from an inner side of the bus bar housing portions 8 of one of the two rows. Further, a plurality of connecting portions 13 connecting the routing portion 12 and the bus bar housing portions 8 of the other row are provided in the casing 7. The plurality of connecting portions 13 are arranged parallel to each other so as to extend in the width direction of the bus bar module 1. A connecting portion 13A of the plurality of connecting portions 13 is provided so as to be continued from an extension wall of a lead-out portion 8A to be described later of the bus bar housing portion 8, and the voltage detection line 5 led out from the lead-out portion 8A is placed in the connecting portion 13A. The voltage detection line 5 extends to the routing portion 12 through the lead-out portion 8A to be routed therein.

In the present embodiment, three bus bar housing portions 8 are provided. Two of the three bus bar housing portions 8 are in a point-symmetric relation and arranged on a straight line in the Y-arrow direction, and the remaining one is provided at a position opposite to the two bus bar housing portions 8 in the X-arrow direction.

As illustrated in FIG. 4, the plurality of bus bar housing portions 8 each include a bottom wall 80 (illustrated in FIG. 6) on a surface of which the bus bar 3 is placed, a pair of first side walls 81 opposed to each other in the width direction of the bus bar module 1 (X-arrow direction), and a pair of second side walls 82 and 83 provided so as to be continued from the pair of first side walls 81, respectively, and opposed to each other in the longitudinal direction of the bus bar module 1 (Y-arrow direction).

Both sides of the bottom wall 80 in the Y-arrow direction are opened for insertion of the electrodes 22 and 23 of the batteries 20.

The pair of first side walls 81 each have, on an inner surface thereof, locking pawls 81A for locking the bus bar 3 and voltage detection terminal 4 placed on the bottom wall 80. The pair of second side walls 82 and 83 has projection line portions 82a and 83a protruding from outer surfaces thereof and extending in the up-down direction (Z-arrow direction). Further, at a position adjacent to the side wall 82 of the pair of second side walls 82 and 83, a lead-out port for leading out the voltage detection line 5 connected to the voltage detection terminal 4 housed in the bus bar housing portion 8 is formed so as to cut the second side wall 82.

The casing 7 has, at a position adjacent to the lead-out port of the bus bar housing portion 8, a lead-out portion 8A for leading out the voltage detection line 5 connected to the voltage detection terminal 4 housed in the bus bar housing portion 8 toward the connecting portion 13A. The lead-out portion 8A includes an extension wall (not illustrated) formed so as to extend in an surface extending direction of the bottom wall 80 and a partition wall 85 provided so as to be continued from the lead-out port and extend in parallel to the first side wall 81. The voltage detection line 5 led out from the bus bar housing portion 8 passes through the lead-out portion 8A and housed between the first side wall 81 and the partition wall 85. Then, the other end side of the voltage detection line 5 is bent in an L-shape or in a crank shape in the lead-out portion 8A and led out toward the connecting portion 13A to be described later.

Figure 5:
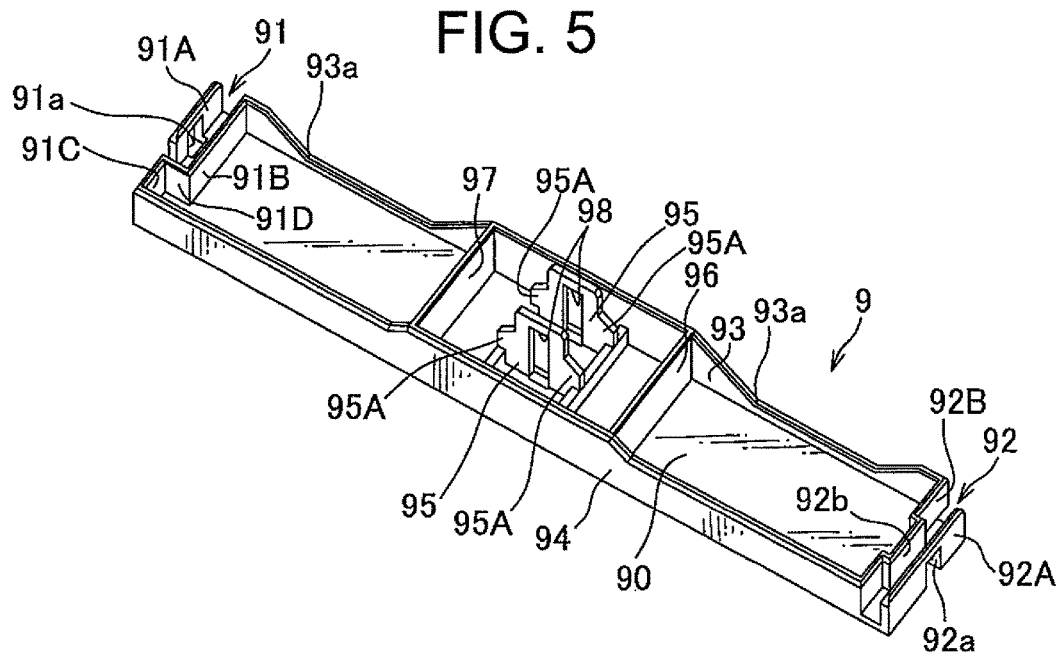
FIG. 5 is a perspective view illustrating the cover portion illustrated in FIG. 2 as viewed from a back side thereof.

As illustrated in FIG. 5, the cover portion 9 includes a rectangular plate-like base wall 90 having a size slightly smaller than that of the opening of the bus bar housing portion 8, a pair of opposing walls 91 and 92 erected at both end portions of the base wall 90 in a longitudinal direction thereof (Y-arrow direction) so as to receive insertion of the pair of second side walls 82 and 83 of the bus bar housing portion 8 arranged in the longitudinal direction thereof, and a pair of side walls 93 and 94 erected from both ends of the base wall 90 in the width direction thereof so as to be opposed to each other.

The cover portion 9 is locked to the bus bar 3. In a state where the cover portion 9 covers the opening of the bus bar housing portion 8, an upper surface of the base wall 90 recedes from upper ends of the side walls 81, 82, and 83 of the bus bar housing portion 8. With this configuration, even if the bus bar housing portion 8 interferes with other members due to, e.g., vibration of the vehicle, the cover portion 9 can be suppressed from interfering with the other members.

The wall 91 of the pair of opposing walls 91 and 92 includes first outer and inner walls 91A and 91B between which the second side wall 82 of the bus bar housing portion 8 is inserted, a wall 91C provided at a position on the same line as the first outer wall 91A in the width direction of the cover portion 9 between which and the first outer wall 91A the partition wall 85 of the lead-out portion 8A is inserted, and a continuous wall 91D provided along a longitudinal direction of the cover portion 9 so as to be continued from the wall 91C and first inner wall 91B. The first outer wall 91A has a through hole 91a into which the projection line portion 82a is fitted.

The wall 92 of the pair of opposing walls 91 and 92 includes second outer and inner walls 92A and 92B between which the second side wall 83 of the bus bar housing portion 8 is inserted. The second outer wall 92A has a through hole 92a into which the projection line portion 83a is fitted. The second inner wall 92B has a pushed portion 92b formed by being pushed out toward the second outer wall 92A side.

The side wall 93 of the pair of side walls 93 and 94 has a cut 93a for visually confirming an inside of the bus bar housing portion 8. The cut 93a is obtained by cutting lower ends of the side walls 93 and 94 and is provided at both end portions of the side wall 93 in the Y-arrow direction. In a state where the cover portion 9 covers the opening of the bus bar housing portion 8, the side wall 93 is provided with an interval (space) from the side wall 81 of the bus bar housing portion 8. Thus, it is possible to visually confirm, through the space and cut 93a, whether or not the nuts 2A are engaged with the electrodes 22 and 23 of the batteries 20.

The cover portion 9 further includes a pair of arms 95 serving as a protruding portion erected in a plate-like manner from the base wall 90 to the bus bar 3 so as to be locked to the locking projections 33 of the bus bar 3, a bus bar press portion 96 erected in a plate-like manner from the base wall 90 so as to press the bus bar 3 toward the bottom wall 80 of the bus bar housing portion 8, and a terminal press portion 97 erected in a plate-like manner from the base wall 90 so as to press the voltage detection terminal 4 overlapped on the bus bar 3 toward the bottom wall 80. The bus bar press portion 96 and terminal press portion 97 are provided on both sides of the pair of arms 95 in the Y-arrow direction so as to be opposed to each other. A dimension of the bus bar press portion 96 in the erected direction is smaller than a dimension of the terminal press portion 97 in the erected direction by a dimension of the voltage detection terminal 4 in the plate thickness direction.

The bus bar press portion 96 presses the bus bar 3 toward the bottom wall 80, and the terminal press portion 97 presses the voltage detection terminal 4 overlapped on the bus bar 3 toward the bottom wall 80, which means that both the bus bar press portion 96 and the terminal press portion 97 press the bus bar 3. Thus, the bus bar press portion 96 and the terminal press portion 97 are collectively referred to as "press portion" in the appended claims.

The pair of arms 95 are provided so as to be opposed to each other in the width direction of the base wall 90 (X-arrow direction) and are elastically deformable in the width direction. Each arm 95 has a projection receiving portion 98 locked by the locking projection 33 of the bus bar 3 at a lower surface of a through hole penetrating the arm 95. In the present embodiment, "the locking portion 32 of the bus bar 3 locks the projection receiving portions 98 of the pair of arms 95" means that the locking projections 33 formed in the locking portion 32 are positioned on the projection receiving portions 98 formed in the pair of arms 95.

Each arm 95 has a reinforcing rib 95A for reinforcing the arm 95 at both sides thereof in the Y-arrow direction. The reinforcing rib 95A protrudes in a surface extending direction of the arm 95.

Figure 6:
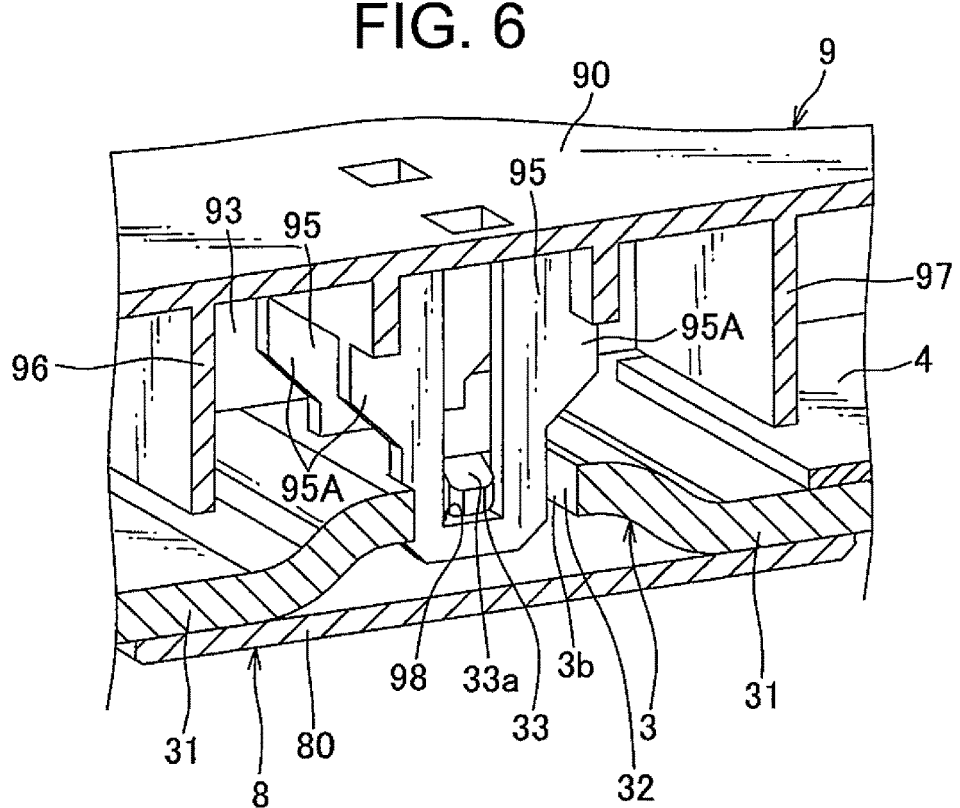
FIG. 6 is a cross-sectional view taken along a line I-I in FIG. 2.
Figure 7:
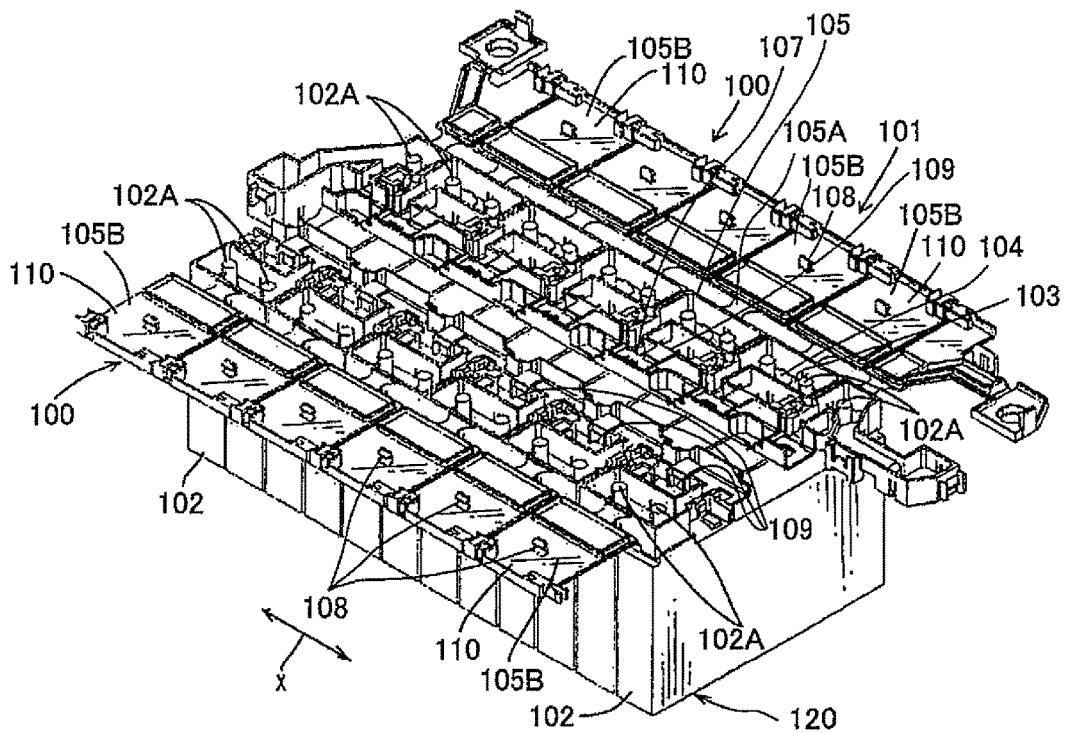
FIG. 7 is a perspective view illustrating a battery module having a conventional battery connecting assembly.

The following describes, with reference to FIG. 6, a procedure in which the cover portion 9 is locked by the bus bar 3 to be retained by (to be attached to) the bus bar 3. The cover portion 9 is brought close to the bottom wall 80 from the pair of arms 95 side to the bottom wall 80 of the bus bar housing portion 8 so as to cover the opening of the bus bar housing portion 8, and the pair of arms 95 is inserted into the pair of insertion holes 3b, respectively. Then, a leading end of each arm 95 abuts against the guide surface 33a of the locking projection 33 of the bus bar 3 and guided along the guide surface 33a, with the result that the pair of arms 95 are elastically deformed in a direction separating from each other. As each arm 95 is inserted further into the insertion hole 3b, the leading end of the arm 95 rides on and over the locking projection 33, with the result that the locking projection 33 is positioned on the projection receiving portion 98 of the arm 95. In this state, the locking portion 32 locks the projection receiving portion 98 of the arm 95. At the same time, the bus bar press portion 96 presses the bus bar 3 toward the bottom wall 80 of the bus bar housing portion 8, and the terminal press portion 97 presses the voltage detection terminal 4 overlapped on the bus bar 3 toward the bottom wall 80. In this manner, the cover portion 9 is retained by the bus bar 3. In this state, the bus bar press portion 96 and the terminal press portion 97 press the bus bar 3 and the voltage detection terminal 4, respectively, toward the bottom wall 80. Thus, in a state of being retained by the bus bar 3, the cover portion 9 can be prevented from rattling in a height direction (Z-arrow direction). Further, the locking portion 32 is positioned at a center of the bus bar 3, and the pair of arms 95 is positioned at a center of the cover portion 9, so that the bus bar 3 and cover portion 9 can be locked to each other with a good balance. Thus, the cover portion 9 can be retained more reliably, thereby effectively preventing the cover portion 9 and the bus bar 3 from coming off each other due to vibration and the like.

When the lock of the cover portion 9 by the bus bar 3 is released, the following procedure is taken. That is, as illustrated in FIG. 2, a not illustrated jig is inserted between the pair of arms 95 from the space between the first side wall 81 of the bus bar housing portion 8 and side wall 94 of the cover portion 9 and cut 94a of the cover portion 9 to move the cover portion 9 in a direction away from the bus bar 3 while elastically deforming the pair of arms 95 in such a direction that they separate from each other. In this manner, the lock of the locking projection 33 to the projection receiving portion 98 is released to remove the cover portion 9 from the bus bar 3. Thus, the pair of arms 95 can be detachably attached to the locking portion 31 of the bus bar 3.

The following describes, with reference to FIG. 1, an assembly procedure of the power supply device 10 having the above configuration. The bus bars 3, the voltage detection terminals 4, the casing 7, and the like are previously produced individually, and the voltage detection lines 5 are connected to each voltage detection terminal 4. Then, each bus bar 3 is pushed to the bottom wall 80 of each bus bar housing portion 8 of the casing 7 and locked by the locking pawl 81A. Further, the voltage detection terminal 4 is pushed to the bottom wall 80 so as to be overlapped on the bus bar 3, and the bus bar 3 and the voltage detection terminal 4 are locked by the locking pawl 81A. The pair of openings on the bottom wall 80 side provided in the bus bar housing portion 8 and the pair of through holes 3a formed in the bus bar 3 are overlapped with each other, and the through hole formed in the voltage detection terminal 4 is overlapped on the bus bar housing portion 8 and one of the pair of through holes 3a of the bus bar 3. Further, the other end of each voltage detection line 5 connected to each voltage detection terminal 4 is led out from the lead-out portion 8A, made to pass through the connecting portion 13A, and routed in the routing portion 12.

Then, the casing 7 is brought close to the upper surface of the battery assembly 2, and the nuts 2A are screwed with the positive and negative electrodes 22 and 23 inserted through the openings of the casing 7 on the bottom wall 80 side, the through holes 3a of the bus bars 3, and the through holes of the voltage detection terminals 4. In this manner, the electrodes 22 and 23 of the batteries 20, the bus bars 3 and the voltage detection terminals 4 are electrically connected and fixed to one another. Finally, the cover portions 9 are locked by the bus bars 3 to be retained by (attached to) the bus bars 3. Thus, the assembly of the power supply device 10 is completed.

According to the above-described embodiment, the casing 7 includes the plurality of bus bar housing portions 8 each housing the bus bar 3 and the cover portion 9 covering the opening of each of the plurality of bus bar housing portions 8. The cover portion 9 is retained by the bus bar 3, so that even if cracks have occurred in the bus bar housing portion 8 or even if the bus bar housing portion 8 has been damaged due to application of vibration of the vehicle to the bus bar housing portion 8, the cover portion 9 and the bus bar 3 can be prevented from being separated from each other, and a state where the cover portion 9 covers the bus bar 3 can be maintained. Further, the bus bar 3 is fixed to the electrodes 22 and 23 of the batteries 20, so that even if cracks have occurred in the bus bar housing portion 8 or even if the bus bar housing portion 8 has been damaged due to application of vibration of the vehicle to the bus bar housing portion 8, the bus bar 3 can reliably be prevented from being exposed.

While the present invention has been described with a preferred embodiment, it is to be understood that the present invention is not limited to the configuration described in the above embodiment. In the above embodiment, one cover portion 9 corresponds to one bus bar housing portion 8 that houses each bus bar 3; however, the present invention is not limited to this. The casing 7 may have at least one cover portion formed into a size that can cover the openings of the plurality of bus bar housing portions 8. Further, in the above embodiment, the bus bar 3 has the stepped portion 34 obtained by hammering the bus bar 3 so as to form the locking portion 32; however, the present invention is not limited to this. The bus bar 3 may not have the stepped portion 34. In this case, a configuration may be employed in which a concave portion for forming a space between the bottom wall 80 of the bus bar housing portion 8 and bus bar 3 is formed in the bottom wall 80. Further, in the above embodiment, the pair of insertion holes 3*b* through which the pair of arms 95 are inserted, respectively, are formed in the bus bar 3, and the locking projection 33 is formed in the inner surface of the each insertion hole 3*b*; however, the present invention is not limited to this. The pair of insertion holes 3*b* may be omitted. In this case, the following configuration may be employed: a dimension between the pair of arms 95 is made substantially equal to a width dimension (X-arrow direction dimension) of the bus bar 3 at the locking portion 32, and locking projections protruding from width direction both ends of the locking portion 32 in a direction away from each other are formed so as to lock the projection receiving portions 98 of the pair of arms 95.

Further, in the above embodiment, the locking projections 33 are provided in the bus bar 3; however, the present invention is not limited to this. The locking projection may be provided in the pair of arms 95. In this case, the locking projections are hooked to the lower surface of the locking portion 32, whereby the locking portion 32 of the bus bar 3 locks the pair of arms 95. Further, in the above embodiment, the cover portion 9 is detachably attached to the bus bar 3. However, in addition, the cover portion 9 may be detachably locked to the bus bar housing portion 8.

The above embodiments are typical only, and the present invention is not limited thereto. That is, those skilled in the art can make various modifications according to conventional known knowledge without departing from the scope of the present invention. The modifications are included in the category of the present invention as long as the configurations of the battery connecting body and the power supply device according to the present invention are realized in the modifications.

Reference Signs List

| | |
|---|---|
| 1 | Bus bar module (example of "battery connecting body") |
| 10 | Power supply device |
| 2 | Battery assembly |
| 3 | Bus bar (example of "connecting member") |
| 7 | Casing |
| 8 | Bus bar housing portion (example of "connecting member housing portion") |
| 80 | Bottom wall |
| 9 | Cover portion |
| 31 | Pair of contact portions |
| 32 | Locking portion |
| 34 | Stepped portion |
| 95 | Pair of arms (example of "protruding portion") |
| 96 | Bus bar press portion (example of "press portion") |
| 97 | Terminal press portion (example of "press portion") |

The invention claimed is:

1. A battery connecting body comprising:
a plurality of connecting members that each connect electrodes of adjacent ones of a plurality of batteries arranged such that the electrodes thereof are arranged on a straight line to electrically connect the plurality of batteries; and
a casing that houses the plurality of connecting members, wherein
the casing includes a plurality of connecting member housing portions that each house each of the connecting members and cover portions that each cover an opening of each of the connecting member housing portions, and
the cover portions are each retained by protruding portions inside of the cover portions inserted into the connecting members wherein at least one of the connecting members is a bus bar.

2. The battery connecting body according to claim 1, wherein
a protruding portion, of the protruding portions, is formed so as to protrude toward the connecting member, and
the connecting member has a locking portion for locking the protruding portion.

3. The battery connecting body according to claim 2, wherein
the cover portion has a pair of arms as the protruding portion, and
each of the connecting members has a pair of contact portions that contact the electrodes of the adjacent batteries, and the locking portion that is disposed between the pair of contact portions and detachably locks the pair of arms.

4. The battery connecting body according to claim 3, wherein
the connecting member housing portion has a bottom wall on which the connecting member is placed, and
the connecting member has a stepped portion formed between the pair of contact portions and the locking portion so that the locking portion is disposed at a side further away from the bottom wall than the pair of contact portions in a state where the connecting member is housed in the connecting member housing portion.

5. The battery connecting body according to claim 3, wherein
the connecting member housing portion has a bottom wall on which the connecting member is placed, and
the cover portion has a press portion that is formed so as to protrude in the same direction as the pair of arms and presses the connecting member toward the bottom wall of the connecting member housing portion.

6. The battery connecting body according to claim 4, wherein the connecting member housing portion has a bottom wall on which the connecting member is placed, and the cover portion has a press portion that is formed so as to protrude in the same direction as the pair of arms and presses the connecting member toward the bottom wall of the connecting member housing portion.

7. A power supply device comprising:

a battery assembly including a plurality of batteries in which positive and negative electrodes are overlapped mutually in reverse; and a battery connecting body as claimed in claim 1, wherein the connecting member is fixed to the electrodes of the batteries.

8. A power supply device comprising:

a battery assembly including a plurality of batteries in which positive and negative electrodes are overlapped mutually in reverse; and a battery connecting body as claimed in claim 2, wherein the connecting member is fixed to the electrodes of the batteries.

9. A power supply device comprising:

a battery assembly including a plurality of batteries in which positive and negative electrodes are overlapped mutually in reverse; and a battery connecting body as claimed in claim 3, wherein the connecting member is fixed to the electrodes of the batteries.

10. A power supply device comprising:

a battery assembly including a plurality of batteries in which positive and negative electrodes are overlapped mutually in reverse; and a battery connecting body as claimed in claim 4, wherein the connecting member is fixed to the electrodes of the batteries.

11. A power supply device comprising:

a battery assembly including a plurality of batteries in which positive and negative electrodes are overlapped mutually in reverse; and a battery connecting body as claimed in claim 5, wherein the connecting member is fixed to the electrodes of the batteries.

12. A power supply device comprising:

a battery assembly including a plurality of batteries in which positive and negative electrodes are overlapped mutually in reverse; and a battery connecting body as claimed in claim 6, wherein the connecting member is fixed to the electrodes of the batteries.

13. The battery connecting body according to claim 1, wherein the bus bar comprises:

a plurality of arms, each comprising one of a plurality of holes configured to receive ones of the electrodes;

a locking portion arranged between the plurality of arms and raised from the plurality of arms by a plurality of stepped portions of the bus bar, wherein the locking portion comprises at least one insertion hole through which at least one of the protruding portions of the cover portions is inserted, and wherein the locking portion further comprises a locking projection within the at least one insertion hole, the locking projection locked to the at least one of the protruding portions.

14. The battery connecting body according to claim 13, wherein the locking projection projects through an opening of the at least one of the protruding portions, and wherein the locking projection is within the insertion hole and projects through the opening in a direction perpendicular to a direction in which the at least one of the protruding portions is inserted into the at least one insertion hole.

\* \* \* \* \*